G. ANDERSON.
PROTECTOR BLOCK.
APPLICATION FILED APR. 8, 1911.
1,000,767. Patented Aug. 15, 1911.
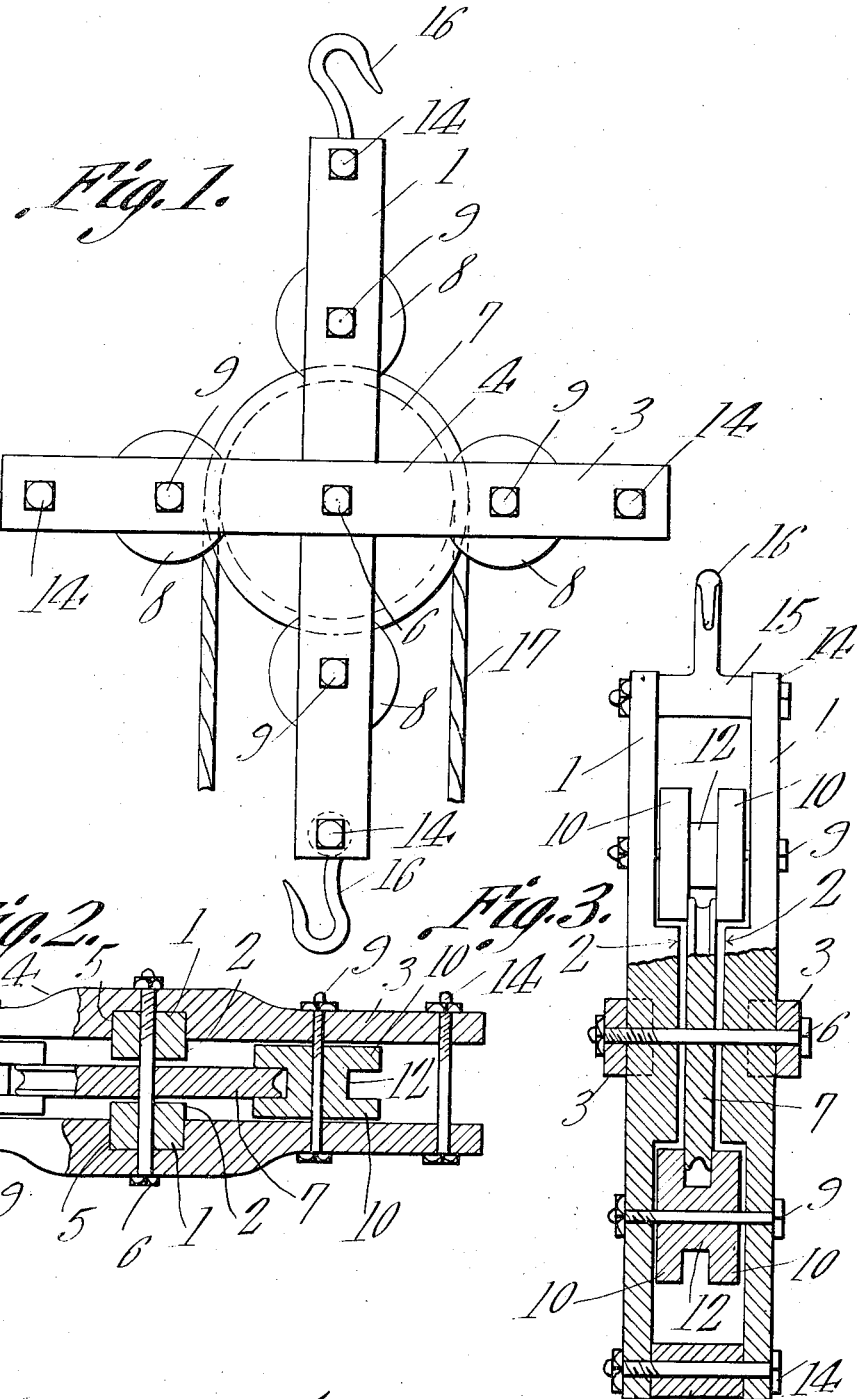

UNITED STATES PATENT OFFICE.

GUST ANDERSON, OF SPOKANE, WASHINGTON, ASSIGNOR OF ONE-HALF TO ALEXANDER LANDEN, OF SPOKANE, WASHINGTON.

PROTECTOR-BLOCK.

1,000,767.　　　　　Specification of Letters Patent.　　Patented Aug. 15, 1911.

Application filed April 8, 1911. Serial No. 619,798.

*To all whom it may concern:*

Be it known that I, GUST ANDERSON, a citizen of the United States, residing at Spokane, in the county of Spokane and State of Washington, have invented a new and useful Protector-Block, of which the following is a specification.

It is the object of the present invention to provide a block so constructed that the falls cannot by any possibility jump from the sheave, and become wedged between the sheave and the supporting structure in which the sheath is journaled for rotation.

Another object of the invention is to provide a means whereby the lateral friction of the sheave against the supporting structure will be diminished.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a side elevation; Fig. 2 is a sectional top plan; and Fig. 3 is a sectional side elevation.

The supporting structure may be of any form. Preferably, however, it consists of primary members 1, having inwardly extended ribs 2 in their central portions, and secondary members 3, extended across the primary members 1 upon the outer faces of the primary members. In their central portions, the secondary members 3 are thickened, as denoted by the numeral 4, these thickened portions 4 being notched, as shown at 5, to receive the angularly disposed primary members 1. At their point of crossing, the primary and secondary members are connected by a securing element 6, preferably a bolt, and upon this bolt is journaled for rotation, between the ribs 2 of the primary members 1, the sheave 7, the sheave having the usual grooved tread to receive the falls.

In the primary members 1, and in the secondary members 3, auxiliary pulleys 8 are journaled for rotation, adjacent the periphery of the sheave 7. These auxiliary pulleys 8 are grooved, to define flanges 10, adapted to overlap the side faces of the sheave 7. The axle portions 12 of the pulleys 8 are disposed in close relation to the periphery of the sheave 7. The auxiliary pulleys 8 are preferably journaled for rotation upon bolts 9, or other securing elements, extending through the primary members 1, and through the secondary members 3. The ends of the primary members 1, and the ends of the secondary members 3, are united by bolts or other securing elements, denoted by the numeral 14. Certain of these bolts 14, preferably those which are located at the ends of the primary members 1, carry rotatably, between the primary members 1, collars 15, from which outstand hooks 16.

It will be seen that the rope 17 may be extended about the sheave 7 in any desired direction, and the ends of the rope carried off at practically any angle. Owing to the fact that the periphery of the sheave 7 fits between the flanges 10 of the auxiliary pulleys 8, and owing to the fact that the axle portion 12 of each of the auxiliary pulleys 8, is located in close proximity to the periphery of the sheave 7, the rope 17 cannot jump from the sheave 7, and become lodged between the sheave and any portion of the supporting structure. The pulleys 8, moreover, exercise another important function in the operation of the structure. It is to be noted that owing to the fact that the periphery of the sheave 7 is engaged between the flanges 10 of the auxiliary pulleys 8, the sheave 7 cannot come into contact with the ribs 2 or into contact laterally, with any other portion of the sheave-supporting structure. The sheave 7 is peripherally engaged by the flanges 10 of the auxiliary pulleys 8, and since these pulleys 8 are journaled for rotation, the pulleys receive, rotatably, any lateral thrust which may be exerted by the sheave 7, and thus the friction of the sheave is greatly reduced.

It will be seen, readily, that the hooks 16, or either of them, may be engaged with an overhead support, with a stake driven into the ground, or with any other convenient and accessible form of support. The device is capable of a wide application, but it will be found useful, primarily, in logging operations.

Having thus described the invention, what is claimed is:—

1. In a device of the class described, a supporting structure; a sheave journaled for rotation therein; and auxiliary pulleys journaled for rotation in the supporting structure, about the periphery of the sheave, the pulleys having flanges adapted to overlie both sides of the sheave.

2. In a device of the class described, a supporting structure; a sheave journaled for rotation therein; and auxiliary pulleys journaled for rotation in the supporting structure and disposed about the periphery of the sheave, the auxiliary pulleys having flanges extended inwardly upon both sides of the sheave, beyond the periphery of the sheave, and toward the axis of rotation of the sheave.

3. In a device of the class described, a supporting structure; a sheave journaled for rotation therein; and an auxiliary pulley journaled for rotation in the supporting structure, adjacent the periphery of the sheave, the auxiliary pulley having a groove, into which the periphery of the sheave projects.

4. In a device of the class described, intersecting primary and secondary members; a retaining element uniting the primary and secondary members at their point of intersection; a sheave journaled for rotation upon the retaining element; and auxiliary pulleys journaled for rotation in the primary and secondary members, the auxiliary pulleys having grooves within which the periphery of the sheave fits.

5. A device of the class described comprising a supporting structure; a sheave journaled for rotation therein; and auxiliary pulleys journaled for rotation in the supporting structure, about the periphery of the sheave, the auxiliary pulleys having flanges adapted to overlie the side faces of the sheave, to prevent the sheave from coming into contact with the supporting structure, laterally, and the auxiliary pulleys having axle portions, disposed in close relation to the periphery of the sheave, whereby the flexible member which is passed about the sheave, will be prevented from jumping from the sheave.

In testimony that I claim the foregoing as my own, I have hereto affixed my signature in the presence of two witnesses.

GUST ANDERSON.

Witnesses:
A. LANDEN,
J. A. SULLIVAN.